Patented Mar. 12, 1940

2,192,925

UNITED STATES PATENT OFFICE 2,192,925

β-ALKYLCHOLINE SALTS AND THEIR ACYL ESTERS

Randolph T. Major, Plainfield, and Howard T. Bonnett, Rahway, N. J., assignors to Merck & Co. Inc., Rahway, N. J., a corporation of New Jersey No Drawing. Original application December 4, 1935, Serial No. 52,872. Divided and this application November 1, 1937, Serial No. 172,240

4 Claims. (Cl. 260—584)

This application is a division of our copending application Serial No. 52,872, filed December 4, 1935, which issued on November 8, 1938, as Patent No. 2,135,521. This invention relates to certain higher homologues of beta-methylcholine halide and to the process for their production.

The co-pending application of one of us, Randolph T. Major, in association with Joseph K. Cline, Serial No. 733,604, filed July 13, 1934, which issued on May 12, 1936, as Patent No. 2,040,146, relates to the preparation of acetyl-β-methylcholine chloride. We have now succeeded in producing, as well, its hitherto unknown higher homologues.

The general series of the β-n-alkyl choline halides which are the subject of the present invention have been tested pharmacologically with interesting results. It has been found that, while the acyl derivatives of these new compounds exhibit generally a "muscarine" action similar to that of acetyl-β-methylcholine chloride, the non-acylated higher homologues exhibit rather unexpected and important differences in their therapeutic action. Thus, for instance, while the β-hexylcholine and the β-heptylcholine chlorides exhibit a "muscarine" action, the β-propylcholine and the β-butylcholine chlorides exhibit the typical, so-called "nicotinic" action which is a matter of considerable practical therapeutic interest.

Broadly, the process of the present invention is directed to the production of beta-alkylcholine halides by the condensation of given chlorhydrins with methyl amines.

One preferred modification of our process for producing these β-alkylcholine salts consists in reacting upon an appropriate chlorhydrin with dimethylamine and converting the resulting dimethylamino-alkanol into its methiodide, from which the β-n-alkylcholine chloride may be readily obtained, and which latter may then be readily acylated by appropriate means. The process outlined above is preferably directed to the production of the higher of the homologues of β-methylcholines which constitute the subject-matter of our invention, but some of the relatively lower homologues in question, as for instance, β-ethylcholine chloride, β-n-propylcholine chloride, etc., may be prepared directly by treating the appropriately selected chlorhydrin with trimethylamine, thus avoiding the intermediate step of forming the methiodide.

While either modification of the above described method may be employed, for the preparation of all of the homologues herein contemplated, it has been found more convenient, because of the rapid increase in hygroscopicity with increase in size of the alkyl group, to prepare the higher homologues by means of the reaction of methyl iodide on dimethylamino-alkanol, so that the necessary purification may be more readily effected.

The appropriate chlorhydrins used as starting materials in each instance were prepared by the reaction of chloroacetaldehyde with the selected Grignard reagent. The hitherto unreported 1-chlorononanol-2, was also prepared in this way.

During the working out of our process a number of intermediate compounds were prepared which had not previously been described; these include 1-dimethylamino-butanol-2, 1-dimethylamino-pentanol-2, 1-dimethylamino-hexanol-2, 1-dimethylamino-octanol-2, and 1-dimethylamino-nonanol-2.

The following description of the more detailed steps of the process exemplifies specific adaptations of the general method set forth above to the ultimate production of various specific acetyl-β-alkylcholine halides, which are embraced within the scope of our invention.

*Preparation of 1-dimethylamino-alkanol-2.*—The appropriate chlorohydrin is heated with a solution of two mols. of dimethylamine in benzene at 115–120° C. for about 15 hours, and isolated from the resulting mixture by the usual methods. The compounds obtained are mobile, colorless liquids possessing a strong amine-like odor. 1-dimethylamino-butanol-2 and 1-dimethylamino-pentanol-2 are very soluble in water, but the higher homologues are insoluble in water; all of the compounds are soluble in the usual organic solvents.

*Preparation of β-n-alkylcholine iodide.*—The methiodides of the 1-dimethylamino-alkanol-2 compounds are prepared by treating the latter with methyl iodide at room temperature. They are recrystallized from warm acetone to which ether is added, and occur in the form of non-hygroscopic white, micro-crystalline solids.

*Preparation of β-n-alkylcholine chloride.*—The β-n-alkylcholine iodides are converted to their corresponding chlorides by reacting upon them with AgCl in alcoholic solution by the methods of Jones and Major (Jour. Am. Chem. Soc., 52, 309—1930). The silver salts formed in the reaction are removed by filtration, and the β-n-alkylcholine chloride is precipitated by the addition of anhydrous ether to the filtrate. The last traces of silver chloride are removed by adding the precipitate to a saturated solution of alkylcholine iodides, chlorides shown on the same line in the other columns of the table.

| Chlorohydrins | Alkyl R | $(CH_3)_2N-CH_2CHOH-R$ | $(CH_3)_3NICH_2CHOH-R$ | $(CH_3)_3NClCH_2CHOH-R$ |
|---|---|---|---|---|
| 1-chlorobutanol-2 | $C_2H_5$ | B. P. 142–144° C. 760/mm | M. P. 162–3° C. | M. P. 174–6° C. |
| 1-chloropentanol-2 | n-$C_3H_7$ | B. P. 73–74° C. 30/mm | M. P. 198–200° C. | M. P. 115–7° C. |
| 1-chlorohexanol-2 | n-$C_4H_9$ | B. P. 89–90° C. 25/mm | M. P. 90–92° C. | M. P. 100.5–102° C. |
| 1-chloroheptanol-2 | n-$C_5H_{11}$ | B. P. 83–85° C. 11/mm | M. P. 98–100° C. | M. P. 72–74° C. |
| 1-chloro-octanol-2 | n-$C_6H_{13}$ | B. P. 99–101° C. 10/mm | M. P. 109–110° C. | M. P. 69–71° C. |
| 1-chlorononanol-2 | n-$C_7H_{15}$ | B. P. 104–106° C. 5/mm | M. P. 122.5–123.5° C. | M. P. 97–99° C. | hydrogen sulfide in absolute alcohol. Activated charcoal is added and the mixture filtered.

β-ethylcholine chloride may be recrystallized from butyl alcohol, β-propylcholine may be recrystallized from a mixture of butyl alcohol and isopropyl ether and β-butylcholine may be recrystallized with difficulty from a mixture of butyl alcohol and benzene. The remaining compounds are obtained in the form of gums which crystallize on standing in a desiccator. The final products are obtained in the form of white, extremely hygroscopic solids.

Examples for the production of other products of this series can be readily derived by reference to the table given below, with the selection of any given chlorhydrin shown in the first column of the table, and its treatment with dimethylamine by the modified steps of the process outlined in detail above, will produce, respectively, the corresponding dimethylamino-alkanols, beta-n-alkylcholine iodides, chlorides shown on the same line in the other columns of the table.

According to the other modifications of our process, as mentioned above, for the preparation of β-ethyl, β-propyl and β-butyl choline chloride, trimethylamine is condensed with the appropriate chlorhydrin in benzene solution at 110° C. for about 24 hours. The resulting choline chlorides are precipitated by the addition of ether and recrystallized from organic solvents as indicated.

We claim as our invention:

1. A product of the group consisting of β-ethylcholine chloride, β-ethyl choline iodide, β-n-propyl choline iodide, β-n-butylcholine iodide, β-n-hexylcholine iodide, β-n-hexylcholine chloride, β-n-heptylcholine iodide, and β-n-heptylcholine chloride.
2. β-ethylcholine iodide.
3. β-n-propylcholine iodide.
4. β-n-heptylcholine chloride.

RANDOLPH T. MAJOR.
HOWARD T. BONNETT.